(12) United States Patent
Wild et al.

(10) Patent No.: US 7,412,812 B2
(45) Date of Patent: Aug. 19, 2008

(54) FILLING APPARATUS AND METHOD

(75) Inventors: Hans-Peter Wild, Eppelheim (DE); Eberhard Kraft, Neckarbischofsheim (DE); Michael Kurz, Muhlhausen (DE)

(73) Assignee: Indag Gesellschaft Fuer Industriebedarf mbH & Co. Betriebs KG, Eppelheim (DE)

( * ) Notice: Subject to any disclaimer, the term of this patent is extended or adjusted under 35 U.S.C. 154(b) by 0 days.

(21) Appl. No.: 11/494,302

(22) Filed: Jul. 25, 2006

(65) Prior Publication Data

US 2007/0180796 A1 Aug. 9, 2007

(30) Foreign Application Priority Data

Jul. 28, 2005 (EP) .................................. 05016444

(51) Int. Cl.
*B65B 3/04* (2006.01)
*B65B 55/14* (2006.01)
*B65B 63/08* (2006.01)

(52) U.S. Cl. .............................. 53/440; 53/471; 53/127; 53/281

(58) Field of Classification Search ................... 53/440, 53/527; 414/760, 769
See application file for complete search history.

(56) References Cited

U.S. PATENT DOCUMENTS

| 2,527,024 | A | * | 10/1950 | Mitchell | 198/403 |
|---|---|---|---|---|---|
| 2,527,252 | A | * | 10/1950 | Gorman, Jr. | 53/157 |
| 2,657,845 | A | * | 11/1953 | Smith | 53/539 |
| 2,982,072 | A | * | 5/1961 | McGihon | 53/243 |
| 3,356,510 | A | * | 12/1967 | Barnby | 426/399 |
| 3,593,493 | A | * | 7/1971 | Alduk | 53/243 |
| 3,619,967 | A | * | 11/1971 | Alduk | 53/448 |
| 3,702,524 | A | * | 11/1972 | Johnson et al. | 53/497 |
| 4,220,239 | A | * | 9/1980 | Prichard, Jr. | 198/403 |
| 4,788,811 | A | * | 12/1988 | Kawajiri et al. | 53/426 |
| 5,006,037 | A | * | 4/1991 | Bluemle | 414/771 |
| 5,555,702 | A | * | 9/1996 | Sizer | 53/127 |
| 2004/0131735 | A1 | | 7/2004 | Korengel et al. | |

FOREIGN PATENT DOCUMENTS

| EP | 0 337 010 | 10/1989 |
|---|---|---|
| EP | 0 661 208 A1 | 7/1995 |
| GB | 993003 | 10/1963 |
| JP | 2001354213 A | 8/2002 |

OTHER PUBLICATIONS

International Search Report No. EP 05 01 6444 dated Dec. 13, 2005.
Russian Office Action in Patent Application No. 2006124458/13 (026526) dated Oct. 1, 2007 with English translation of the Office Action.

* cited by examiner

*Primary Examiner*—Stephen F Gerrity
(74) *Attorney, Agent, or Firm*—Stroock & Stroock & Lavan, LLP

(57) ABSTRACT

The invention relates to a filling apparatus having a filling device for filling packages with a hot filling, a sealing device for sealing the package, wherein the package has a package seal for opening the package and a swivelling arrangement for swivelling the package so that the package seal contacts the hot filling. Furthermore the invention relates to a filling method in which a hot filling is filled into a package that is sealed thereafter, wherein the package has a package seal and the package is swivelled so that the package seal contacts the hot filling.

23 Claims, 3 Drawing Sheets

FILLING APPARATUS AND METHOD

TECHNICAL FIELD OF THE INVENTION

The invention relates to an apparatus and method for filling liquids into foil bags having a spout. The invention relates more specifically to an apparatus and method for filling perishable drinks into spouted foil bags while they are hot, which can substantially reduce the possible bacterial load at the time of filling.

BACKGROUND OF THE INVENTION

One commonly used drink package includes foil bags, which are characterized by their low empty weight. Furthermore, it is known to provide packages that can be closed with a package seal, such as a sealing cap, after the package has been filled. In this way, the drink is packed in the package with a hermetic seal, to increase shelf-life.

One object of the invention is to guarantee a desirable sterility of the package interior in order to achieve longer shelf life of the drinks than presently available.

SUMMARY OF THE INVENTION

Generally speaking, the present invention is directed toward an apparatus having a mechanism for coordinately positioning the package between at least two positions. More specifically, in accordance with an embodiment of the invention, a mechanism is provided to position the package in at least one position wherein the package seal comes into contact with the hot filling. Because the filling is still hot after being filled, a germicidal effect can develop with the package seal when it contacts the filling in the package.

Different possibilities are available for filling the package in accordance with an embodiment of the invention. For example, the filling can be introduced through a spout already inserted into the package (e.g., welded in). Alternatively, the filling can be filled in through an opening in the package and then this opening can be sealed shut with the spout. A sealing cap can be set on the spout prior to or after the spout seals the package. It is also possible to fill the package through an opening that is positioned next to the package seal or next to the position of a package seal that is to be inserted. The filling devices can be formed accordingly, depending on the procedure utilized.

There are also various possibilities for sealing in accordance with an embodiment of the invention. It is possible to place a sealing cap on a spout. It is possible to insert a (open or closed) spout into the package, in order to seal the opening for the spout in this way. It is also possible to seal an opening in the package at a position other than that of the spout. The sealing device is formed accordingly in each case.

For good germicidal effect, it is advantageous if the filling remains in contact with the package seal for a certain length of time. Therefore, it is advantageous if a device such as a conveyor surface is provided with which the packages can be kept in the position in which the package seal contacts the hot filling, e.g., by means of being conveyed.

In order to achieve good contact between the filling and the package seal, it is preferable to rotate the package from an upright position wherein the package seal is located on top by more than about 30°, 45°, 60°, 75°, 90°, 100°, 120°, 140°, 150°, 180°, 270° or 360° because while air or other gas that is located near the package seal can be displaced.

Furthermore, one embodiment of the mechanism comprises a fixing bracket. This allows, for example, in the case of foil bags, for the package to at least partially jut out between the fixing brackets, so that it can be seized by a conveyor belt arranged below, in order to remove the package from the fixing bracket.

Other objects and features of the present invention will become apparent from the following detailed description considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE INVENTION

For a fuller understanding of the invention, reference is had to the following description taken in connection with the accompanying drawings, in which.

DETAILED DESCRIPTION OF PREFERRED EMBODIMENTS

In the following, foil bags, such as stand-up bags, will be discussed here by way of example for the explanation of packages.

Figure 1:
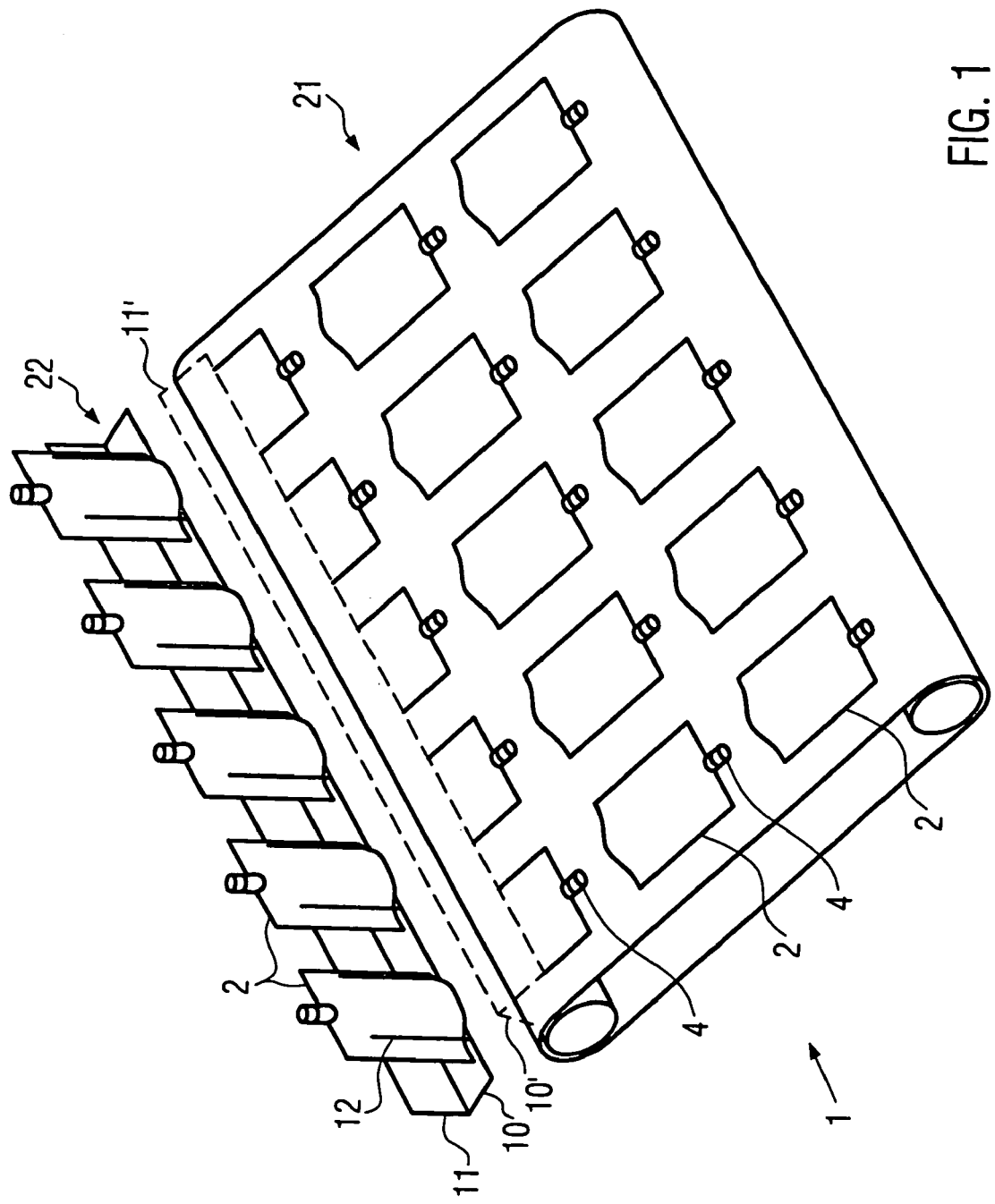
FIG. 1 is a perspective view a mechanism in accordance with an embodiment of the invention.

FIG. 1 shows one embodiment of a positioning mechanism 22 for coordinately positioning foil bags 2. Not depicted is a filling system, which can be arranged, for example to the left of positioning mechanism 22 of FIG. 1 and from which the foil bags 2 can be passed to the positioning mechanism 22.

Figure 3:
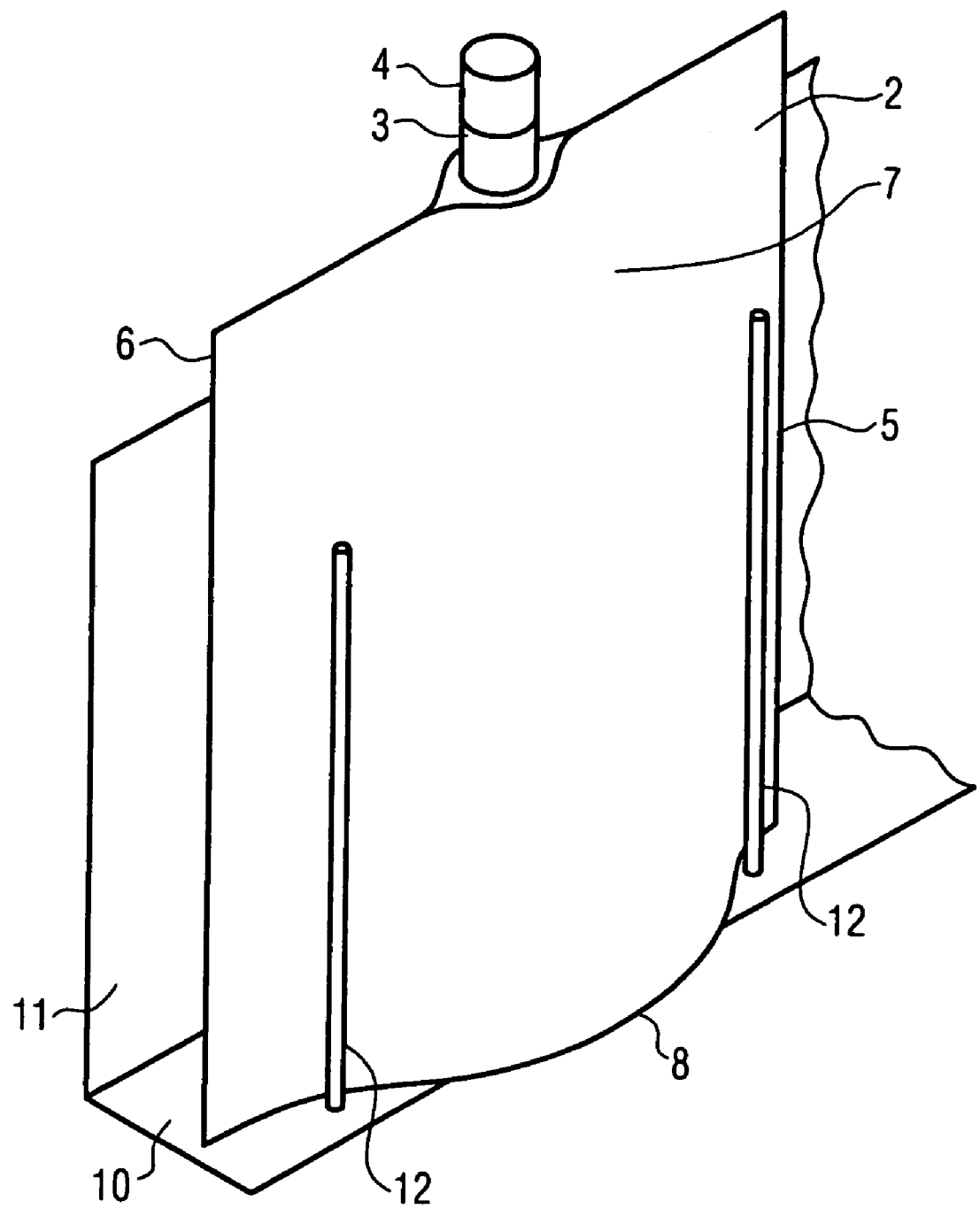
FIG. 3 is a perspective view of a portion of a foil bag in a system in accordance with an embodiment of the invention.

On the upper ends an embodiment of foil bag 2 as shown has a spout 3, which is sealed with a sealing cap 4 (see FIG. 3). After the foil bags 2 are filled with the filling, the sealing caps 4 are positioned in order to seal the foil bags 2. The foil bags 2 are preferably positioned on positioning mechanism 22 either during or after this sealing process.

The spout 3 can be sealed into the foil bags 2 with the sealing cap 4 that can be placed before or after the foil bag 2 has been filled. As a result of sealing the spout 3 into the foil bag 2, the opening of the foil bag 2 that is intended for the spout 3 is sealed. If the entire upper edge of the foil bag 2 is open, the filling can be introduced into the foil bag 2 through this opening. Subsequently, a spout 3 can be placed at the appropriate position (see FIG. 3) and the upper end of the foil bag 2 can be welded together, wherein the spout 3 can become sealed in place.

A further possibility includes filling the foil bag 2 independently of the spout 3 and the sealing cap 4. For this purpose, there can be an opening at the upper edge or even at another position and this opening can he sealed by welding after the filling step. This can take place both with and without the sealed-in spout 3.

Sealing can take place before or after the foil bag is placed on the positioning mechanism 22. Preferably, the sealing device is proximate or attached to positioning mechanism 22.

Figure 2:
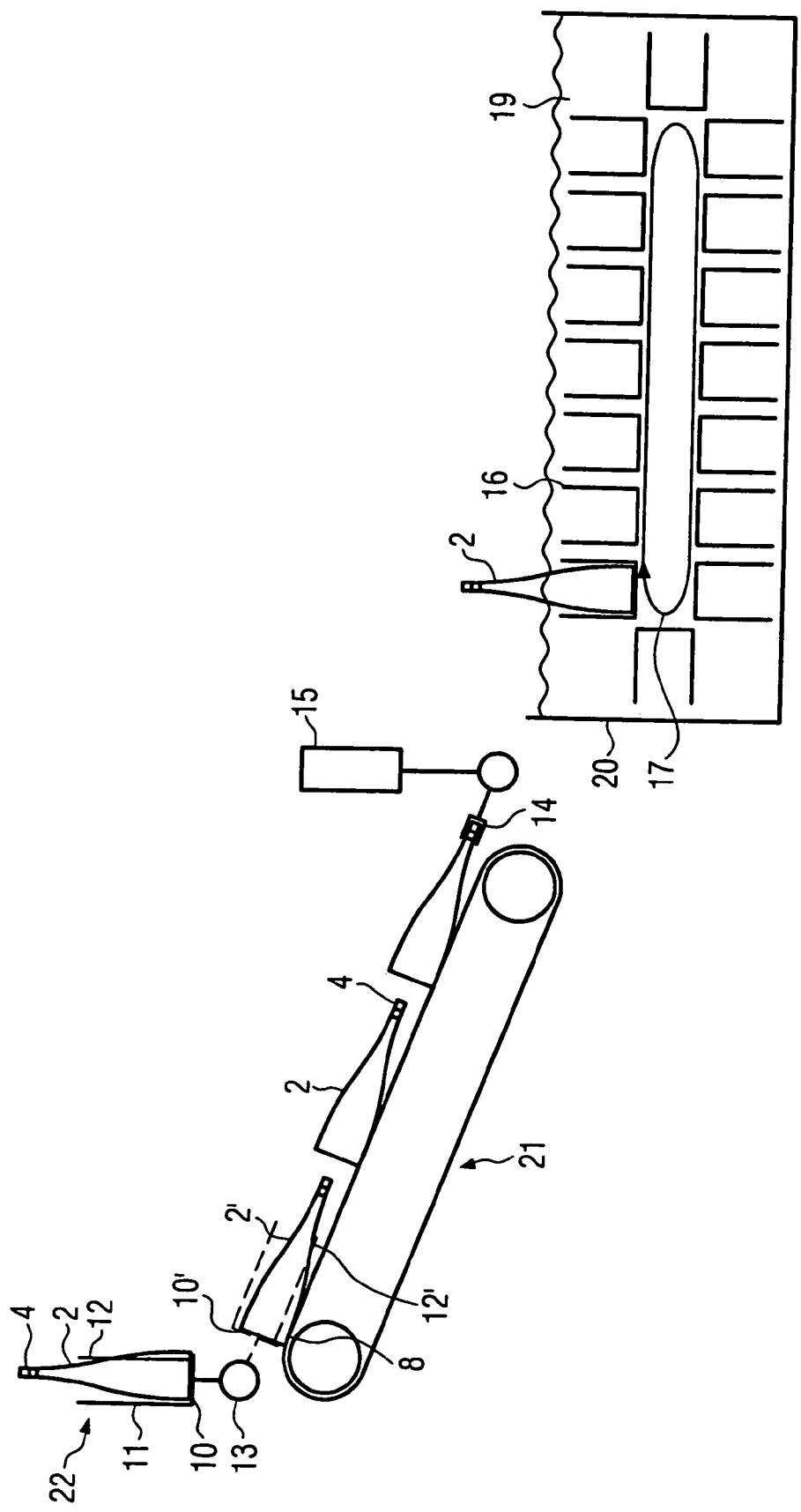
FIG. 2 is a schematic sectional drawing of a system in accordance with an embodiment of the invention.

In accordance with the embodiment shown in FIGS. 1-3, the positioning mechanism 22 has a bottom piece 10 on which the foil bags 2 can stand. Furthermore, the positioning mechanism 22 has a back piece 11, which supports the foil bags 2. Fixing brackets 12 are provided on the side opposite of the back piece 11 to secure foil bags in place.

Preferably the positioning mechanism 22 can be swiveled down to the right in FIG. 1. The final position is shown in dashed lines in FIG. 1. When in this swiveled position, the hot filling comes into contact with the interior of the sealing cap 4, which is positioned downward on the foil bag 2. The foil bags 2 are preferably located over a conveyor belt 21, which can transport foil bags 2 away. Preferably, conveyor belt 21 is constructed and arranged to maintain foil bag 2 in this position for a certain length of time, preferably long enough so that the hot filling has sufficient time to exercise a germicidal effect on the interior of the sealing cap 4 by means of the temperature influence.

FIG. 2 depicts one possible manner in which the positioning mechanism 22 can pivot about an axis 13. Whereas a fixed axis is shown, it is to be understood that positioning mechanism 22 can pivot about an axis that is not fixed, but instead with an articulated frame or the like.

In FIG. 2 it can be seen how a foil bag 2' can contact the conveyor belt 21 at a position 8 in the swiveled position (see dashed line depiction in FIG. 2). At the position 8, a portion the foil bag 2' juts out from between the prongs of the fixing bracket 12 (also see FIG. 3). As a result of this contact, the conveyor belt 21 can pull the foil bag 2' out from between the fixing bracket 12' and back piece 11. This can facilitate the removal of the foil bags 2' from the positioning mechanism 22.

An embodiment of transfer device 15 with a clamp 14 is shown at the lower end of the conveyor belt 21. This transfer device 15 can be used to transfer the foil bag 2 into a quenching bath 20 which preferably contains a cooling liquid 19, such as water. A conveyor 17 having receptacles 16 into which the foil bags 2 can be inserted can circulate in the cooling liquid 19. As a result of the transport through the quenching bath 20, the foil bags 2 and therefore the drink contained inside are preferably cooled off to the extent that the foil bags 2 can be packaged.

As shown in FIG. 3, a foil bag 2 can have a spout 3 sealed in at its upper end. For example, the spout 3 can be closed with a sealing cap 4. The foil bag 2 as shown has side edges 5 and 6, at which there are weld seams. This is where the side foils (of which side foil 7 can be seen) are welded together.

As shown in FIG. 3, the foil bag 2 can jut out over the base plate 10 at its lower end in the area 8.

In one embodiment of the method according to the invention, foil bags 2 are filled and subsequently closed with a sealing cap 4, by means of sealing a spout 3 or by welding together a separate filling opening. The foil bags 2 are subsequently transferred to a positioning mechanism 22. Here the foil bags 2 stand on a bottom piece 10 and are supported by a back piece 11. Fixing brackets 12 are provided on the front of the positioning mechanism 22, wherein the foil bag 2 juts out between the fixing brackets 12 at the location 8. The positioning mechanism 22 pivots by, for example, 100° to 150°, wherein the foil bag 2 can go from an upright position to an at least partially downward position. The hot filling can flow downward toward the sealing cap 4, and the interior of the sealing cap 4 can contact the hot filling in the foil bag 2. Therefore, preferably, the amount of germs on the interior of the sealing cap 4 are at least partially reduced, preferably eliminated, because the filling is still sufficiently hot.

The degree of which the foil bag 2 is rotated is preferably at least 30°, preferably about 45°, 60°, 75° or 90°. Alternatively, the foil bag 2 can be rotated more than 90°, for example, about 180° or 270° or 360° as long as the hot filling contacts the sealing cap 4 sufficiently long enough to kill the germs on the interior side of the sealing cap 4. The upper limit for the swivel angle can be 45°, 60°, 75°, 90°, 100°, 120°, 140°, 160°, 180°, 270° or 360°.

As a result of the swiveling, a germicidal effect is preferably also exercised on the interior side of the spout 3.

In accordance with an embodiment of the invention, conveyor belt 21 can pull the foil bag 2 out of the fixing bracket 12 by contacting and dragging out the portion of the foil bag 2 jutting past the fixing bracket 12. The conveyor 21 then preferably transports the foil bag 2 downwards, maintaining the swiveled position, hence maintaining the germicidal effect during conveyance. The foil bag 2 is then preferably transferred to a quenching bath 20 with a clamp 14 of a transfer device 15. Receptacles 16 that circulate around a conveyor 17 can be provided in the quenching bath 20, in order to cool off the foil bags 2 in a cooling liquid.

The entire apparatus preferably works in cycles, i.e., the positioning mechanism 22 is moved out of the upper position into the swiveling position and back again in one cycle. The conveyor 21, the transfer device 15 and preferably also the conveyor 17 of the quenching bath 20 also preferably correspondingly work in cycles.

Additionally, the apparatus can have multiple tracks in which several foil bags 2 can be treated simultaneously, next to one another. This can allow higher throughput rates to be achieved.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the filling, sealing and positioning mechanism can be unitary or comprise independent construction, the positioning mechanism can utilize different support structures rather than the bottom piece, back piece, and/or brackets, the direction in which the package is rotated can be altered etc. without deviating from the scope of the invention as a matter of application specific to design choice. Additionally, other alterations are encompassed by the invention, as a way of non-limiting example, the number of foil bags that can fit in a positioning mechanism, a different means for maintaining the foil bag in the second position where the hot filling contacts the seal rather than the conveyer, etc., as a matter of application specific to design choice. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

We claim:

1. A filling system comprising:
  a filling mechanism for filling packages with a hot filling,
  a sealing mechanism for sealing the package, wherein the package has a package seal; and
  a rotating mechanism constructed and arranged to coordinately position the packages between a first position wherein the package seal is not in contact with the hot filling to a second position wherein the package seal contacts the hot filling, the rotating mechanism further comprising a bracket and a retaining device for retaining the packages in the second position, the retaining device being constructed and arranged to remove the package from the bracket;

wherein the packages are rotated by an angle of less than 160° from the first position to the second position.

2. The system according to claim 1, wherein the sealing mechanism is constructed and arranged to place a sealing cap on to the package, the sealing cap suitable for sealing the package.

3. The system according to claim 1, wherein the package comprises an opening located next to the package seal, wherein the sealing mechanism is constructed and arranged to seal the opening.

4. The system according to claim 3, wherein package comprises foil material, wherein sealing the opening comprises welding the foil material of the package together.

5. The system according to claim 1, the package comprising an opening, wherein the sealing mechanism is constructed and arranged to insert a package seal or a portion thereof into the opening of the package.

6. The system according to claim 1, wherein the filling mechanism is constructed and arranged to fill the package through the package seal.

7. The system according to claim 1, wherein the filling mechanism is constructed and arranged to fill the package through an opening proximate or at the position of the package seal.

8. The system according to claim 1, wherein the retaining device comprises a conveyor belt.

9. The system according to claim 1, wherein the second position comprises the first position rotated by at least 30°.

10. The system according to claim 1, wherein the a bracket is constructed and arranged to retain the packages in at least the first position.

11. The system according to claim 1, wherein the bracket is located below the package when the package is in the second position.

12. The system according to claim 1, wherein the second position comprises the first position rotated by one of 30°, 45°, 60°, 75°, 90°, 100°, 120°, 140°, or 150°.

13. A method of filling a hot filling into a package comprising:

inserting hot filling into a package, the package being in a first position;

closing the package;

wherein the package includes a package seal;

supporting the package via a bracket and positioning the package in a second position wherein the package seal contacts the hot filling;

wherein the packages are rotated via the bracket between the first and the second position by an angle less than 160°;

removing the package from the bracket via a retaining device; and maintaining the package in the second position via a retaining device for a duration of time.

14. Method according to claim 13, comprising sealing the package including placing a sealing cap on the package.

15. Method according to claim 13, wherein the package comprises an opening proximate the package seal, the method further comprising closing the opening.

16. Method according to claim 13, wherein the package includes an opening, the method further comprising sealing the package including inserting a package seal, in whole or in part, into the opening.

17. Method according to claim 16, wherein inserting the hot filling comprises inserting the hot filling through a portion of the package seal.

18. Method according to claim 13, wherein the package includes an opening proximate the package seal, wherein inserting the hot filling comprises inserting the hot filling through the opening.

19. Method according to claim 13, further comprising conveying the package during the duration of time.

20. Method according to claim 13, wherein the positioning the package comprises rotating the package by at least 30°.

21. Method according to claim 13, wherein positioning the package in the second position includes supporting the package with the bracket.

22. Method according to claim 21, comprising positioning a portion of the package below the bracket to contact a conveyor belt.

23. The method according to claim 13, wherein the positioning the package comprises rotating the package by one of 30°, 45°, 60°, 75°, 90°, 100°, 120°, 140°, or 150 °.

* * * * *